US006816551B1

(12) United States Patent
Kasutani

(10) Patent No.: US 6,816,551 B1
(45) Date of Patent: Nov. 9, 2004

(54) METHOD FOR COMPARING TWO MOVING PICTURES AND RETRIEVAL SYSTEM USING THE METHOD

(75) Inventor: Eiji Kasutani, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/579,304

(22) Filed: May 25, 2000

(30) Foreign Application Priority Data

May 27, 1999 (JP) .......................................... 11-148286

(51) Int. Cl.[7] .............................................. H04N 7/12
(52) U.S. Cl. ............................................. 375/240.08
(58) Field of Search .................. 375/240.08; 386/46, 386/69, 32; 348/699, 700, 416.1, 413.1, 415.1; 382/224, 305, 195, 209

(56) References Cited

U.S. PATENT DOCUMENTS

| 5,870,754 | A | | 2/1999 | Dimitrova et al. | |
| 6,195,497 | B1 | * | 2/2001 | Nagasaka et al. | ............. 386/46 |
| 2002/0012521 | A1 | * | 1/2002 | Nagasaka et al. | ............. 386/46 |

FOREIGN PATENT DOCUMENTS

| EP | 0 878 767 A1 | 11/1998 |
| JP | 8-106543 | 4/1996 |

OTHER PUBLICATIONS

"Multipurpose Scanning Rate Converter IC for Improved Quality Television", Viviana D'Alto, et al., IEEE, pp. 111–114 (1994).

* cited by examiner

*Primary Examiner*—Chris Kelley
*Assistant Examiner*—Behrooz Senfi
(74) *Attorney, Agent, or Firm*—Scully, Scott, Murphy & Presser

(57) ABSTRACT

A moving-picture comparison method allowing the degree of similarity to be precisely computed is disclosed. A database stores a plurality of moving pictures and candidate feature data generated from each moving picture according to candidate timing information. After generating query feature data from a query moving picture according to query timing information, at least one of the candidate feature data and the query feature data is changed based on the query and candidate timing information so that one of the query and candidate feature data exists at a time position of the other. Thereafter, the query feature data and the candidate feature data are compared to compute the degree of similarity.

18 Claims, 6 Drawing Sheets

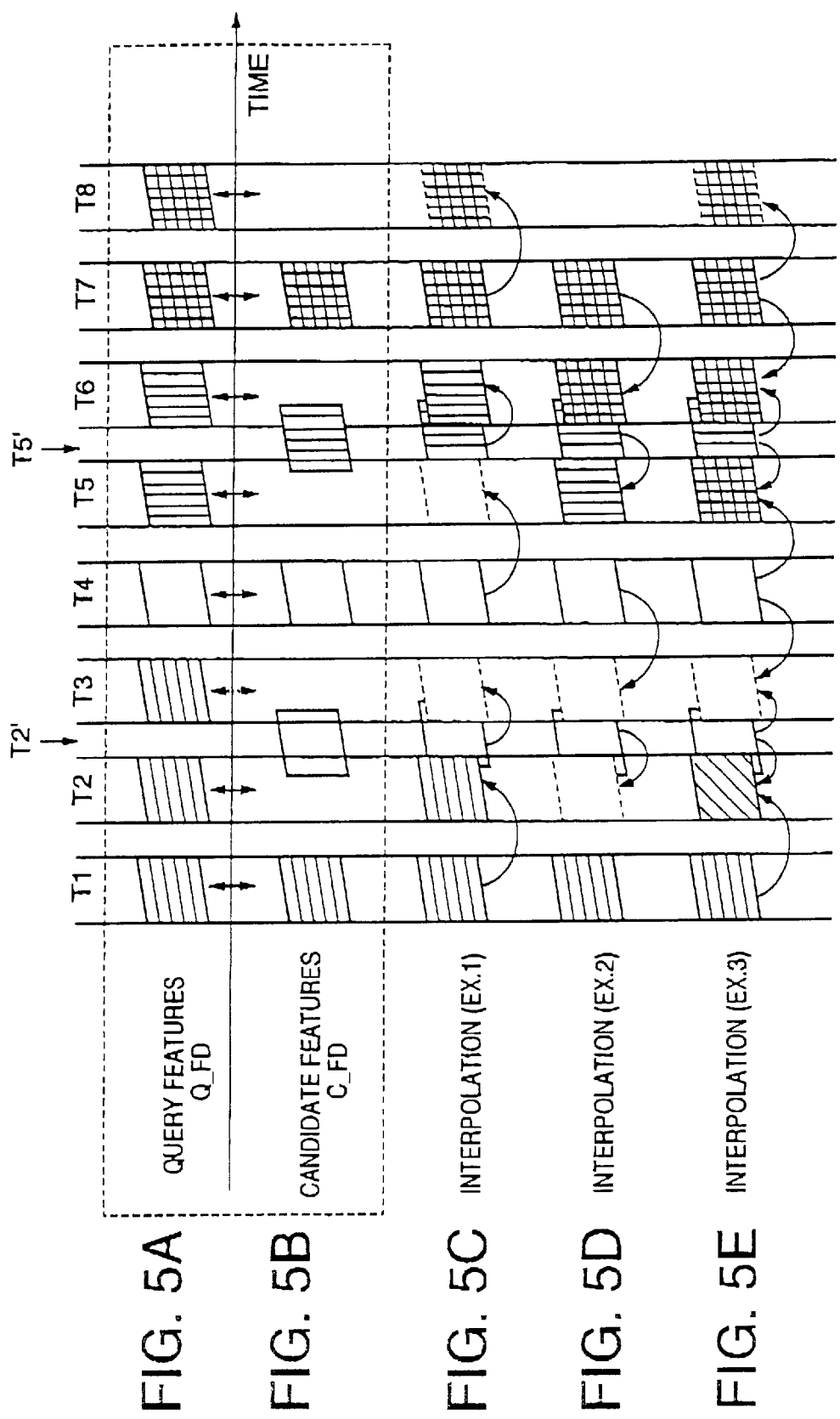

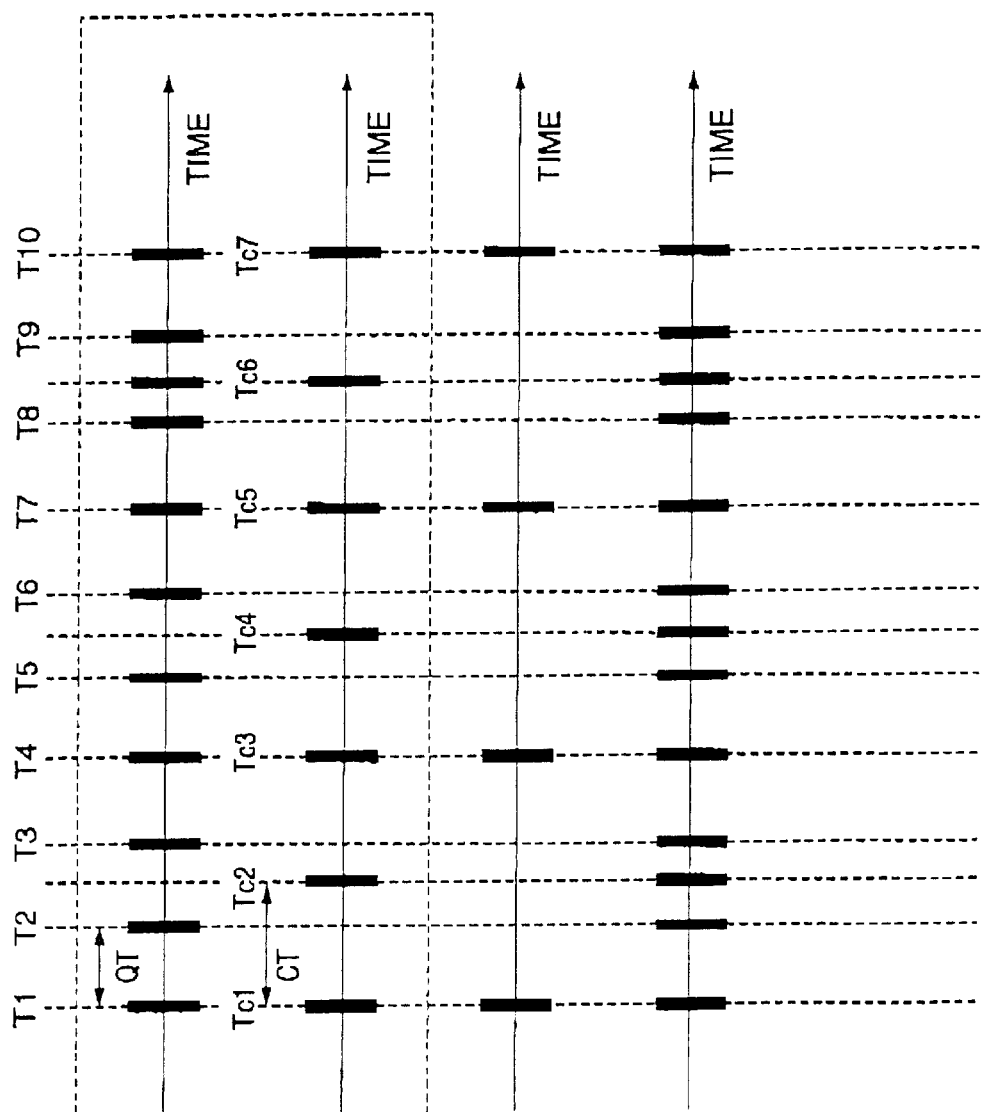

METHOD FOR COMPARING TWO MOVING PICTURES AND RETRIEVAL SYSTEM USING THE METHOD

BACKGROUND OF THE INVENTION

1. Field of the Invention

The present invention relates to techniques for moving-picture retrieval, and in particular to a method for comparing two moving pictures.

2. Description of the Related Art

There have been proposed various moving-picture retrieval methods. For example, a similarity-based moving-picture reproduction technique has been disclosed in Japanese Patent Application Unexamined Publication No. 8-106543. This conventional technique relates to a method for automatically accessing to a target frame by computing the degree of similarity between a reference frame and each frame of a moving picture. Similarity-based retrieval is appropriate for visual information because plural pictures are not exactly matched but similar to a reference picture.

In the case of two moving pictures which are compared to compute the degree of similarity therebetween, however, there are developed the following problems.

First, in the case where at least one of the two moving pictures has a variable time interval between feature extracting time positions, it is impossible to precisely compute the degree of similarity.

Second, in the case where the two moving pictures have the same time interval between feature extracting time positions but have a high frame rate, it is necessary to select a large number of frames for feature extracting, resulting in increased scale of the moving-picture database.

Third, in the case where the two moving pictures have different frame rates, it is also impossible to precisely compute the degree of similarity. For example, among television schemes NTSC, PAL, and SECAM, different transmission frame rates, 50 Hz and 60 Hz, are prescribed. Since the frame-sampling positions for feature extraction are not coincident between different television schemes, precise computation of similarity cannot be obtained.

SUMMARY OF THE INVENTION

It is an object of the present invention to provide a moving-picture comparison method allowing the degree of similarity to be precisely computed.

It is an object of the present invention to provide a moving-picture comparison method and retrieval system allowing the degree of similarity to be precisely computed without increasing in scale of a moving-picture database.

According to the present invention, a method for comparing a first moving picture and a second moving picture, includes the steps of: a) generating first moving-picture feature data from first moving-picture data according to first timing information; b) generating second moving-picture feature data from second moving-picture data according to second timing information; c) changing at least one of the first moving-picture feature data and the second moving-picture feature data based on the first and second timing information so that one of the first moving-picture feature data and the second moving-picture feature data exists at a time position of the other; and d) comparing the first moving-picture feature data and the second moving-picture feature data.

According to an aspect of the present invention, a method for computing a degree of similarity between two moving pictures, includes the steps of: a) retrievably storing moving-picture data of each of a plurality of moving pictures and moving-picture feature data generated from the moving-picture data according to feature extraction timing information of the moving-picture data; b) inputting query moving-picture data and query feature extraction timing information; c) generating query moving-picture feature data from the query moving-picture data according to the query feature extraction timing information; d) reading moving-picture feature data of a selected one of -the moving pictures stored, as candidate moving-picture feature data, wherein the candidate moving-picture feature data was generated from the selected one according to candidate feature extraction timing information; e) changing at least one of the query moving-picture feature data and the candidate moving-picture feature data based on the query and candidate feature extraction timing information so that one of the query moving-picture feature data and the candidate moving-picture feature data exists at a time position of the other; and f) computing the degree of similarity between the query moving-picture feature data and the candidate moving-picture feature data, at least one of which has been changed at the step (e).

The step (e) may include the steps of: e.1) generating reference timing information; e.2) comparing time positions designated by the query feature extraction timing information with those designated by the reference timing information; e.3) changing the query moving-picture feature data so that the query moving-picture feature data exists at a time position designated by the reference timing information; e.4) comparing time positions designated by the candidate feature extraction timing information with those designated by the reference timing information: and e.5) changing the candidate moving-picture feature data so that the candidate moving-picture feature data exists at a time position designated by the reference timing information.

The step (e) may include the steps of: e.1) generating reference timing information from the query and candidate feature extraction timing information according to a predetermined rule; e.2) comparing time positions designated by the query feature extraction timing information with those designated by the reference timing information; e.3) changing the query moving-picture feature data so that the query moving-picture feature data exists at a time position designated by the reference timing information; e.4) comparing time positions designated by the candidate feature extraction timing information with those designated by the reference timing information; and e.5) changing the candidate moving-picture feature data so that the candidate moving-picture feature data exists at a time position designated by the reference timing information.

The step (e) may include the steps of: e.1) comparing time positions designated by the query feature extraction timing information with those designated by the candidate feature extraction timing information; and e.2) interpolating one of the query moving-picture feature data and the candidate moving-picture feature data so that an interpolated one exists at a time position of the other.

The step (e) may include the steps of: e.1) comparing time positions designated by the query feature extraction timing information with those designated by the candidate feature extraction timing information; e.2) selecting common time positions which are designated by both the query feature extraction timing information and the candidate feature extraction timing information; and e.3) changing at least one of the query moving-picture feature data and the candidate moving-picture feature data so that each of the query moving-picture feature data and the candidate moving-picture feature data exists only at the common time positions.

The step (e) may include the steps of: e.1) comparing time positions designated by the query feature extraction timing information with those designated by the candidate feature extraction timing information: e.2) generating expanded time positions which are designated by at least one of the query feature extraction timing information and the candidate feature extraction timing information; and e.3) changing at least one of the query moving-picture feature data and the candidate moving-picture feature data so that each of the query moving-picture feature data and the candidate moving-picture feature data exists at the expanded time positions.

According to another aspect of the present invention, a similarity-based retrieval system includes a database for retrievably storing moving-picture data of each of a plurality of moving pictures and moving-picture feature data generated from the moving--picture data according to feature extraction timing information of the moving-picture data; a feature extractor for extracting query moving-picture feature data from query moving-picture data according to query feature extraction timing information; a feature changer for changing at least one of the query moving-picture feature data and candidate moving-picture feature data based on the query and candidate feature extraction timing information so that one of the query moving-picture feature data and the candidate moving-picture feature data exists at a time position of the other, wherein the candidate moving-picture feature data is moving-picture feature data of a selected one of the moving pictures stored in the moving-picture database, which was generated from the selected one according to the candidate feature extraction timing information; and a controller for calculating the degree of similarity between the query moving-picture feature data and the candidate moving-picture feature data, at least one of which has been changed by the feature changer, to retrieve target moving-picture data similar to the query moving-picture data from the moving-picture database.

As described above, according to the present invention, a candidate feature exists at each of the time positions of a query feature even in the case of variable feature extraction frame interval or different frame rate, precise similarity computation can be performed. Further, it is possible to retrieve a part of moving picture similar to a query moving picture from a moving-picture database.

Therefore, even in the case of fixed frame rate or arbitrary frame rate, the present invention can be widely applied to an examination of the number of times a specific moving picture such as a specific news report, commercial, and the opening of a program has been broadcast, a statistic examination of broadcast information, trend investigation, and the like.

Since features can be extracted from moving-picture data in variable feature extraction timing with precise similarity computation, a reduced scale of the moving-picture database 104 can be achieved.

BRIEF DESCRIPTION OF THE DRAWINGS

FIG. 5A is a time chart showing a sequence of feature-extracted frames of a query moving picture;

FIG. 5B is a time chart showing a sequence of feature-extracted frames of a candidate moving picture:

FIG. 5C is a time chart showing a first example of an interpolated sequence of feature-extracted frames of a candidate moving picture;

FIG. 5D is a time chart showing a second example of an interpolated sequence of feature-extracted frames of a candidate moving picture;

FIG. 5E is a time chart showing a third example of an interpolated sequence of feature-extracted frames of a candidate moving picture;

FIG. 6A is a time chart showing a sequence of feature-extracting time positions of a query moving picture;

FIG. 6B is a time chart showing a sequence of feature-extracting time positions of a candidate moving picture;

FIG. 6C is a time chart showing a first example of an adjusted sequence of feature-extracting time positions of a candidate moving picture; and FIG. 6D is a time chart showing a second example of an adjusted sequence of feature-extracting time positions of a candidate moving picture.

DESCRIPTION OF THE PREFERRED EMBODIMENTS

First Embodiment

Figure 1:
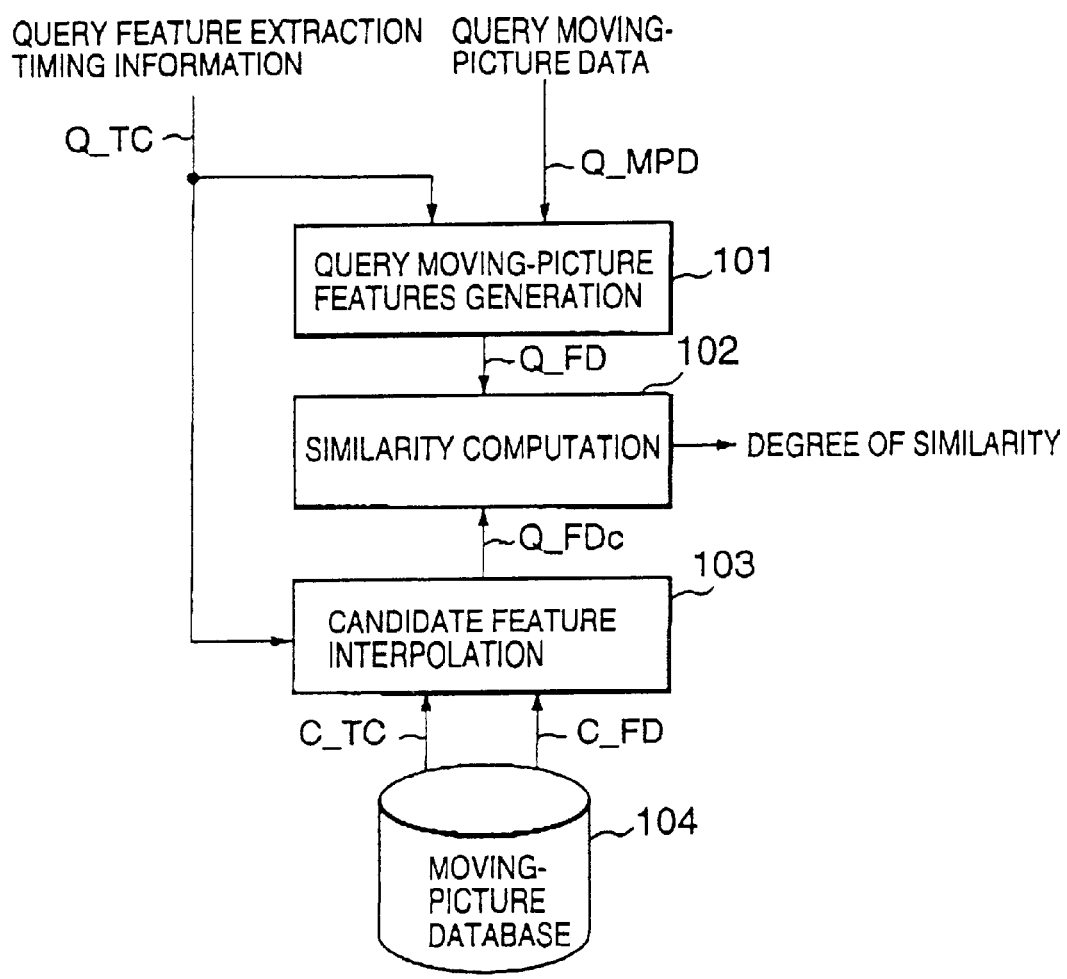
FIG. 1 is a block diagram showing an essential part of a moving-picture similarity computing apparatus according to a first embodiment of the present invention.

Referring to FIG. 1, a moving-picture similarity computing apparatus according to a first embodiment of the present invention includes a query moving-picture feature generation section 101, a similarity computation section 102, a candidate feature interpolation section 103, and a moving-picture database 104.

The query moving-picture feature generation section 101 inputs query moving-picture data Q_MPD and query feature extraction timing information Q_QTC and generates query moving-picture features Q_FD from the query moving-picture data Q_MPD according to the query feature extraction timing information Q_TC.

More specifically, the query moving-picture feature generation section 101 selectively inputs frames/shots of the query moving-picture data Q_MPD at time positions designated by the query feature extraction timing information Q_TC and extracts a feature from the selected frame/shot of picture data. Here, the query feature extraction timing information Q_TC is a time code indicating the time position of an Intra-frame or one representative frame of a shot. In this way, the query moving-picture features Q_FD is generated as a set of features of designated frames/shots.

The moving-picture database 104 stores moving-picture data including moving-picture features that have been generated as the above-described way. More specifically, the moving-picture features are generated from the stored moving-picture data according to time positions of Intra-frame. It should be noted that a time interval between Intra-frames in the stored moving-picture data is not necessary to be equal to a time interval between Intra-frames in the query moving-picture data Q_MPD. The moving-picture database 104 outputs candidate moving-picture features C_FD and candidate feature extraction timing information C_TC of candidate moving picture data to the candidate feature interpolation section 103.

Interpolation

The candidate feature interpolation section 103 compares the query feature extraction timing information Q_TC with the candidate feature extraction timing information C_TC and performs an interpolation operation as necessary so that a candidate feature C_FD exists at the time position of a query feature Q_FD for each designated frame. In this way, corrected or interpolated candidate feature C_FDc is output to the similarity computation section 102. The similarity computation section 102 receives the query features Q_FD and the interpolated candidate features C_FDc and computes the degree of similarity between them. Since a candidate feature C_FD exists at the time position of a query feature Q_FD for each designated frame, precise similarity computation can be performed. The details of the interpolation will be described hereafter.

Referring to FIGS. 5A and 5B, it is assumed for simplicity that query features Q_FD are generated at time positions T1, T2, T3, ..., and T8, respectively, and candidate features C_FD exist at time positions T1, T2', T4', T5', and T7, respectively. In this case, the candidate feature interpolation section 103 detects from the timing information Q_TC and C_TC that candidate features do not exist at time positions T2, T3, T5, T6, and T8. In such a case, interpolation is performed so that the candidate features C_FD are interpolated at the time positions T2, T3, T5, T6, and T8. The following interpolation methods may be employed.

FIRST EXAMPLE

Referring to FIG. 5C, a first example of the interpolation method is to interpolate candidate features by using the immediately previous candidate feature at each of the time positions T2, T3, T5, T6, and T8. For example, at the time position T1, since the candidate feature exists, it is compared with the query feature at the same time position T1. At the time position T2, since no candidate feature exists, the candidate feature at the time position T1 is used as it is. At the time position T3, since no candidate feature exists, the candidate feature at the time position T2' is used as it is.

SECOND EXAMPLE

Referring to FIG. 5D, a second example of the interpolation method is to interpolate candidate features by using the immediately following candidate feature at each of the time positions T2, T3, T5, T6, and T8. For example, at the time position T1, since the candidate feature exists, it is compared with the query feature at the same time position T1. At the time position T2, since no candidate feature exists, the candidate feature at the time position T2' is used as it is. At the time position T3, since no candidate feature exists, the candidate feature at the time position T4 is used as it is.

THIRD EXAMPLE

Referring to FIG. 5E, a third example of the interpolation method is to interpolate candidate features by using the previous and following candidate features at each of the time positions T2, T3, T5, T6, and T8.

As one example, at the time position T1, since the candidate feature exists, it is compared with the query feature at the same time position T1. At the time position T2, since no candidate feature exists, a candidate feature at the time position T2 is generated by averaging the candidate feature at the previous time position T1 and the candidate feature at the following time position T2'. At the time position T3, since no candidate feature exists, a candidate feature at the time position T3 is generated by averaging the candidate feature at the previous time position T2' and the candidate feature at the following time position T4.

As another example, a candidate feature at the time position T2 is generated by assigning weights to the candidate feature at the previous time position T1 and the candidate feature at the following time position T2' before averaging the weighed candidate features, where each weight is determined depending on a time interval between the time position T2 and a corresponding time position. Similarly, at the time position T3, since no candidate feature exists, a candidate feature at the time position T3 is generated by assigning weights to the candidate feature at the previous time position T2' and the candidate feature at the following time position T4 before averaging the weighed candidate features, where each weight is determined depending on a time interval between the time position T3 and a corresponding time position.

Since a candidate feature C_FD exists at each of the time positions of a query feature Q_-FD even in the case of variable time interval or different frame rate, precise similarity computation can be performed. In other words, features can be extracted from moving-picture data in variable feature extraction timing with precise similarity computation. Therefore, a reduced scale of the moving-picture database 104 can be achieved.

Second Embodiment

Figure 2:
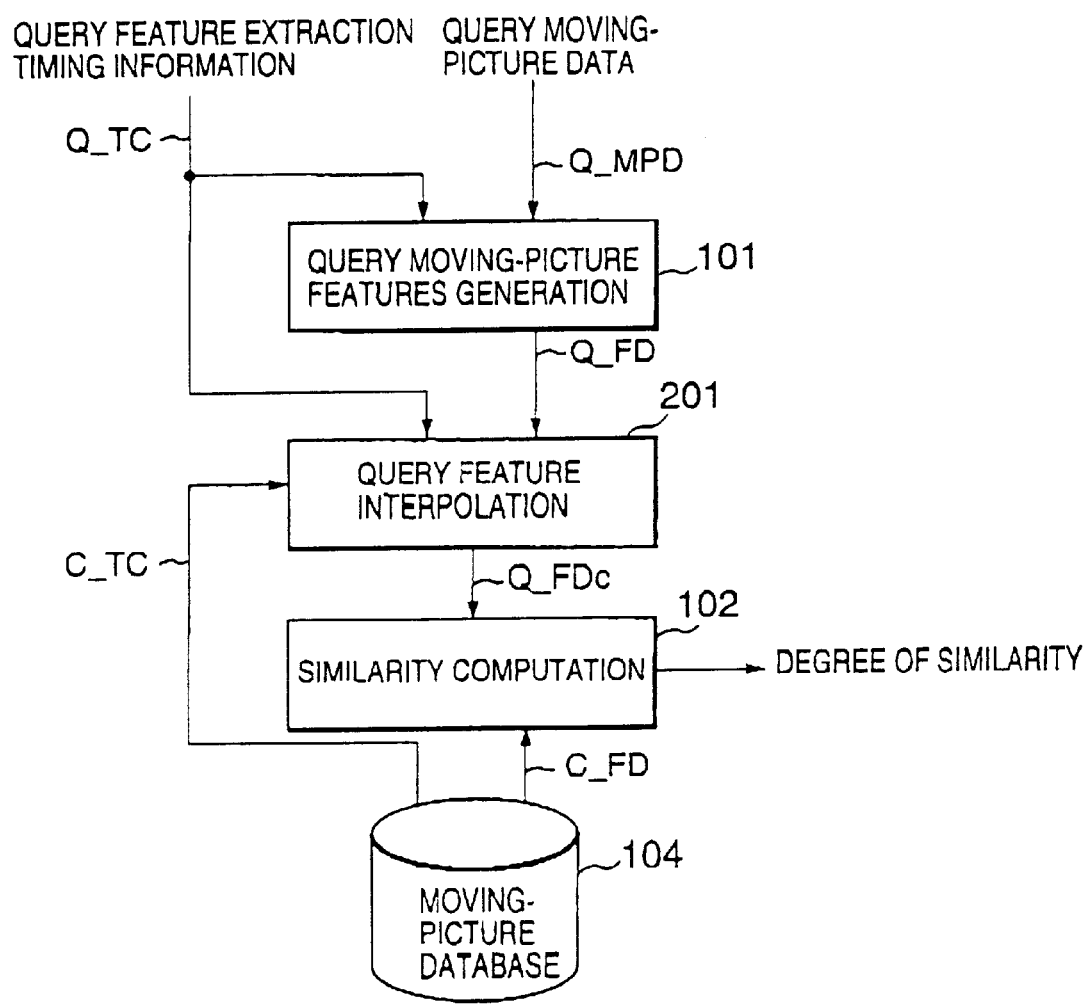
FIG. 2 is a block diagram showing an essential part of a moving-picture similarity computing apparatus according to a second embodiment of the present invention.

Referring to FIG. 2, a moving-picture similarity computing apparatus according to a second embodiment of the present invention includes a query moving-picture feature generation section 101, a query feature interpolation section 201, a similarity computation section 102, and a moving-picture database 104. Blocks similar to those previously described with reference to FIG. 1 are denoted by the same reference numerals and the details thereof are omitted.

The query feature interpolation section 201 compares the query feature extraction timing information Q_TC with the candidate feature extraction timing information C_TC and performs an interpolation operation as necessary so that a query feature Q_FD exists at the time position of a candidate feature C_FD for each designated frame. In this way, corrected or interpolated query feature Q_FDc is output to the similarity computation section 102. The similarity computation section 102 receives the interpolated query features Q_FDc and the candidate features C_FD and computes the degree of similarity between them. Since a query feature Q_FD exists at the time position of a candidate feature C_FD for each designated frame, precise similarity computation can be performed.

Since the operation of interpolation performed by the query feature interpolation section 201 is similar to that performed by the candidate feature interpolation section 103 as shown In FIGS. 5C–5E. the details are omitted.

According to the second embodiment, a query feature Q_FD exists at each of the time positions of a candidate feature C_FD even in the case of variable time interval or different frame rate, precise similarity computation can be performed. Further, it is possible to extract features from the moving-picture data with variable feature extraction timing, resulting in a reduced scale of the moving-picture database 104.

Third Embodiment

Figure 3:
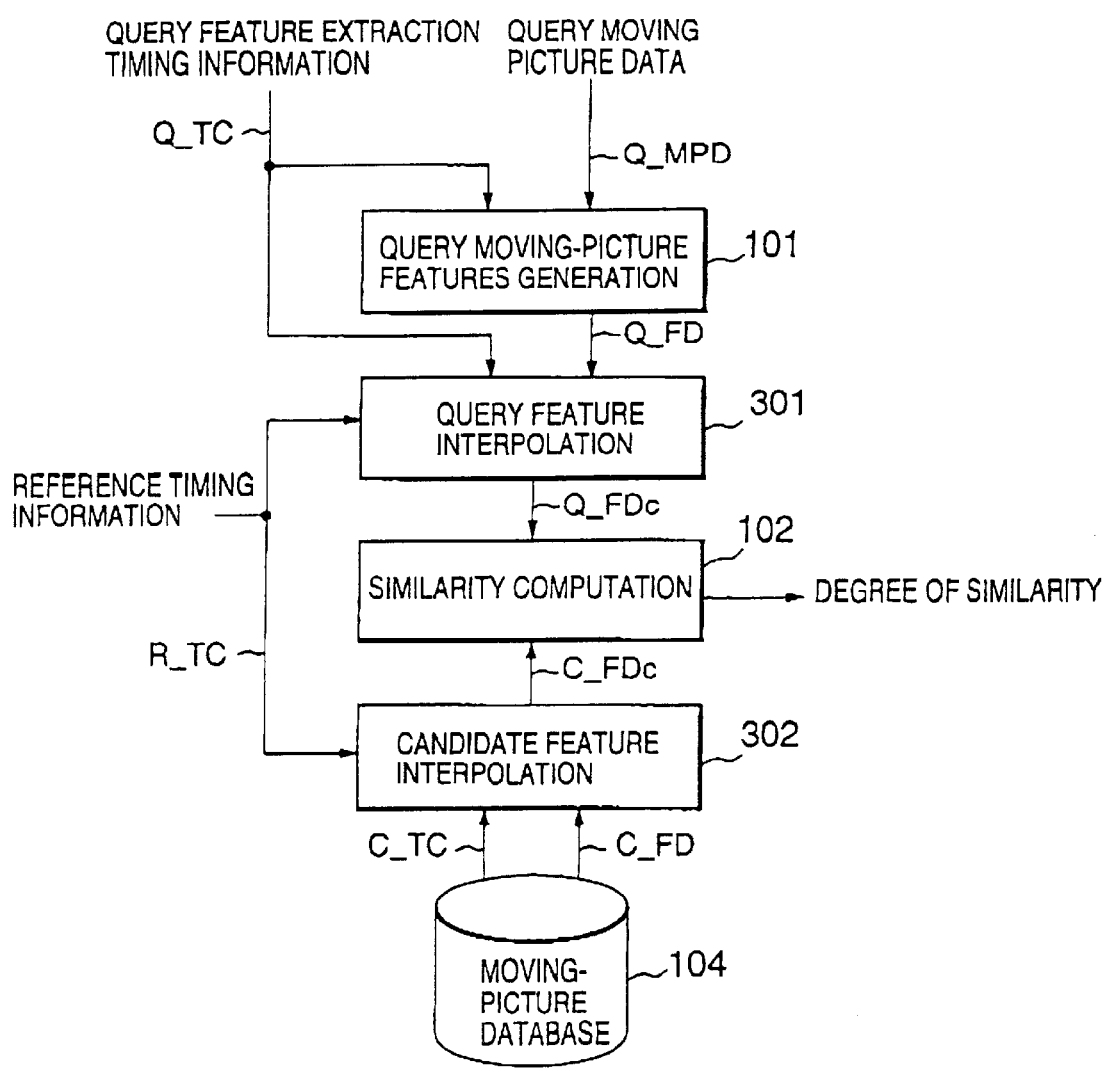
FIG. 3 is a block diagram showing an essential part of a moving-picture similarity computing apparatus according to a third embodiment of the present invention.

Referring to FIG. 3, a moving-picture similarity computing apparatus according to a third embodiment of the present invention includes a query moving-picture feature generation section 101, a query feature interpolation section 301, a similarity computation section 102, a candidate feature interpolation section 302, and a moving-picture database 104. Blocks similar to those previously described with reference to FIG. 1 are denoted by the same reference numerals and the details thereof are omitted.

The query feature interpolation section 301 compares the query feature extraction timing information Q_TC with a predetermined reference timing information R_TC and performs an interpolation operation as necessary so that a query feature Q_FD exists at all the time positions of the reference timing information R_TC. In this way, corrected or interpolated query feature Q_FDc is output to the similarity computation section 102.

The candidate feature interpolation section 302 compares the reference timing Information R_TC with the candidate feature extraction timing information C_TC and performs an interpolation operation as necessary so that a candidate feature C_FD exists at all the time positions of the reference timing information R_TC. In this way, corrected or interpolated candidate feature C_FDc is output to the similarity computation section 102.

The similarity computation section 102 receives the interpolated query features Q_FDc and the interpolated candidate features C_FDC and computes the degree of similarity between them. Since both the candidate features C_FD and the query features Q_FD exist at all the time positions of the reference timing information R_TC, precise similarity computation can be performed.

Since the operations of interpolation performed by the query feature interpolation section 301 and the candidate feature interpolation section 302 are similar to that performed by the candidate feature interpolation section 103 as shown in FIGS. 5C–5E. the details are omitted.

According to the third embodiment, both the candidate features C_FD and the query features Q_FD are in synchronization with each other according to the reference timing information R_TC. Therefore, even in the case of variable time Interval or different frame rate, precise similarity computation can be performed. Further, it is possible to extract features from the moving-picture data with variable feature extraction timing, resulting in a reduced scale of the moving-picture database 104.

Fourth Embodiment

Figure 4:
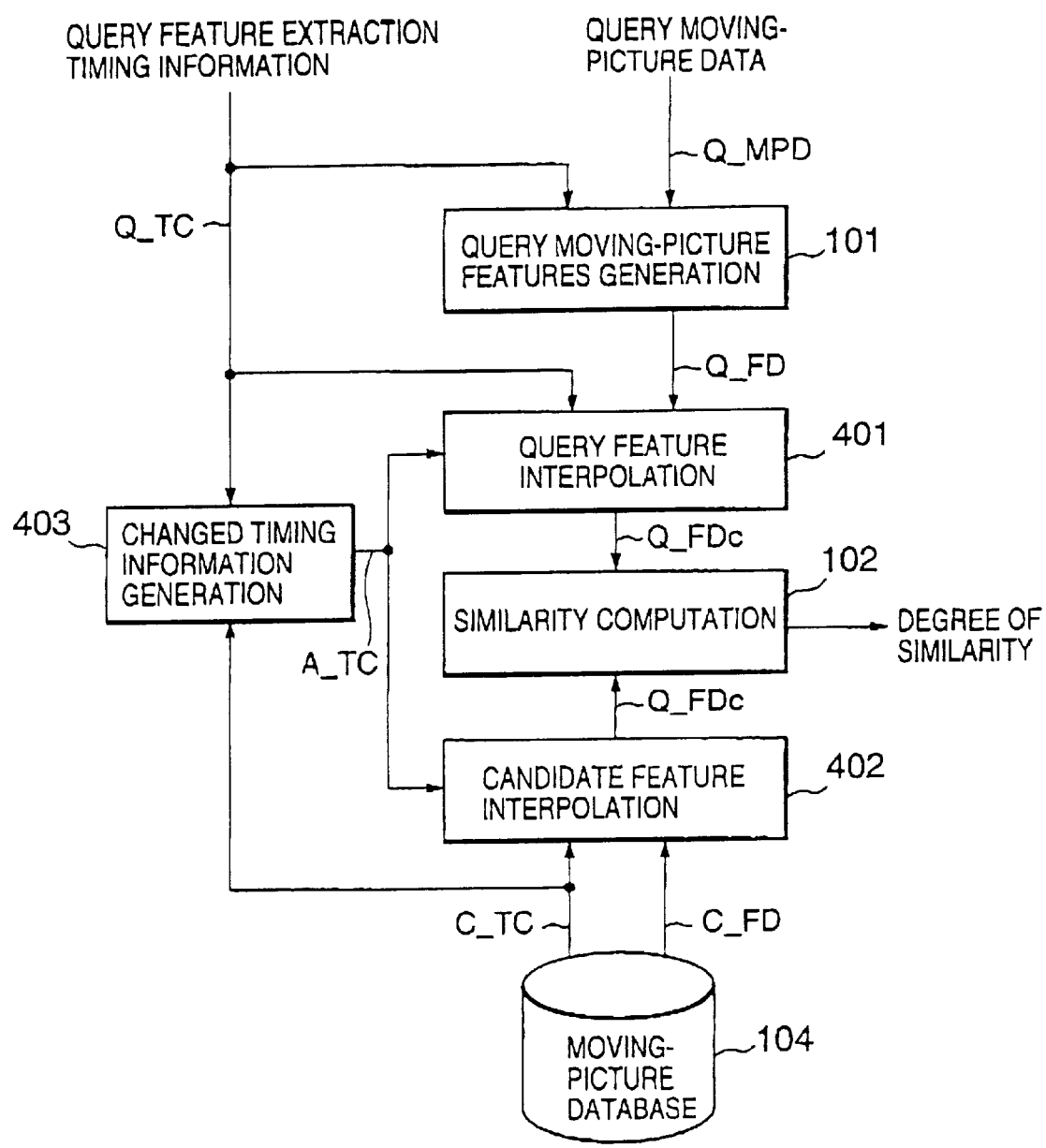
FIG. 4 is a block diagram showing an essential part of a moving-picture similarity computing apparatus according to a fourth embodiment of the present invention.

Referring to FIG. 4, a moving-picture similarity computing apparatus according to a fourth embodiment of the present invention includes a query moving-picture feature generation section 101, a query feature interpolation section 401, a similarity computation section 102, a candidate feature interpolation section 402, a changed timing information generator 403, and a moving-picture database 104. Blocks similar to those previously described with reference to FIG. 1 are denoted by the same reference numerals and the details thereof are omitted.

The changed timing information generator 403 inputs the query feature extraction timing information Q_TC and the candidate feature extraction timing information C_TC and generates changed timing information A_TC from the timing information Q_TC and C_TC according to a predetermined scheme.

The query feature interpolation section 401 compares the query feature extraction timing information Q_TC with the changed timing information A_TC and performs an interpolation operation as necessary so that a query feature Q_FD exists at all the time positions of the changed timing information A_TC. In this way, corrected or interpolated query feature Q_FDc is output to the similarity computation section 102.

The candidate feature interpolation section 402 compares the changed timing information A_TC with the candidate feature extraction timing information C_TC and performs an interpolation operation as necessary so that a candidate feature C_FD exists at all the time positions of the changed timing information A_TC. In this way, corrected or interpolated candidate feature C_FDc is output to the similarity computation section 102.

The similarity computation section 102 receives the interpolated query features Q_FDc and the interpolated candidate features C_FDc and computes the degree of similarity between them. Since both the candidate features C_FD and the query features Q_FD exist at all the time positions of the changed timing information A_TC, precise similarity computation can be performed.

Timing Change

There are several generation methods for generating changed timing information A_TC. First, the changed timing information generator 403 calculates a query time interval between query feature extraction frames from the query feature extraction timing information Q_TC and a candidate time interval between candidate feature extraction frames from the candidate feature extraction timing information C_TC.

If the query time interval is equal to the candidate time interval, all or a part of the time positions of the frames may be used as the changed timing information A_TC. If the query time interval is not equal to the candidate time interval, all or a part of the time positions corresponding to the least common multiple or the greatest common divisor of the query and candidate time intervals can be used as the changed timing information A_TC.

In the case where at least one of the query and candidate time intervals is varied, all or part of the time positions corresponding to one of them, all or part of the time positions at which both (AND) of query and candidate relevant frames exist, or all or part of the time positions at which at least one (OR) of query and candidate relevant frames exists may be used as the changed timing information A_TC.

When the time positions as described above are determined, the time position generation is adaptively switched between executed and not-executed depending on a correlation between features of each frame and another frame in proximity thereto.

Among the above-described methods, the AND- and OR-timing changing methods will be described hereafter.

Referring to FIGS. 6A and 6B, it is assumed for simplicity that the query feature extraction timing information (time code) Q_TC provides time positions T1, T2, T3, . . . , and T10, and the candidate feature extraction timing information (time code) C_TC provides time positions Tc1, Tc2, Tc3, . . . , and Tc7. In this case, the changed timing information generator 403 calculates a query time interval QT between query feature extraction frames from the query feature extraction timing information Q_TC and a candidate time interval CT between candidate feature extraction frames from the candidate feature extraction timing information C_TC. Here, the query time interval QT is shorter than the candidate time interval CT.

Referring to FIG. 6C, the changed timing information generator 403 generates the changed timing information A_TC providing the time positions at which both (AND) of query and candidate feature extraction time positions exist. For example, the time positions T1/Tc1, T4/Tc3, T7/Tc5, T10/Tc7 are used as the changed timing information A_TC.

Referring to FIG. 6D, the changed timing information generator 403 generates the changed timing information A_TC providing the time positions at which at least one (OR) of query and candidate feature extraction time positions exists. For example the time positions T1/Tc1, T2, Tc2, T3, T4/Tc3, . . . are used as the changed timing information A_TC.

In the above-described embodiments of the present invention, query moving-picture feature generation section, similarity computation section, candidate feature interpolation section, query feature interpolation section, and changed timing information generator may be implemented with a program-controlled processor.

Advantages of the Invention

An experiment of similarity-based retrieval from a moving-picture database storing a plurality of moving pictures having different frame rates was carried out. More specifically, the database retrievably stores a plurality of moving pictures that total to 24 hours and are MPEG-1 encoded data. Each of the plurality of moving pictures has one of two different frame rates: 30 frames per second and 25 frames per second. Each of the plurality of moving pictures has one of three kinds of time interval between Intra-frames: a time interval between Intra-frames of 12 frames, a second time interval between Intra-frames of 15 frames, or a third time interval between Intra-frames adaptively varying. The feature of each Intra-frame is generated by extracting a direct-current component from the Intra-frame, generating a reduced image from the Intra-frame, further reducing the reduced image into an image consisting of 8×8 pixels and then performing DCT (Discrete Cosine Transform) on the further reduced image of 8×8 pixels. The time code of each Intra-frame is used as the feature extraction timing information.

As described before, when query moving-picture data is provided, a candidate feature of a candidate moving-picture segment is output from the moving-picture database. If there is no feature of an Intra-frame in the candidate moving-picture segment at a time position indicated by the query feature extraction timing information, then a feature is interpolated at the time position by using the previous, following, or both features. Using the interpolated candidate feature and the query feature at that time position, the degree of similarity between them is computed.

An experiment in similarity-based retrieval according to the present invention was made using moving-picture data, which is formed by repeating the same moving picture consisting of eleven specific moving-picture segments (specific scenes) including news reports, commercials, and the openings of programs. More specifically, when any specific scene of the one moving picture is used as query moving picture data, the scene of the other moving picture corresponding to the query moving picture data can be retrieved. Even in the case of different frame rates or different time intervals between Intra-frames, therefore, one moving picture can be discriminated from the other for each moving-picture segment or scene.

As another experiment, when provided with the scene of a succor game as query moving-picture data, the scene of a different succor game on a different program was retrieved as a similar moving picture segment. Further, similarity-based retrieval was successfully performed as for a moving-picture segment having a different telop (television opaque projector) on a different background, a different seaside shot, or the like.

As described above, according to the present invention, a candidate feature exists at each of the time positions of a query feature even in the case of variable feature extraction frame interval or different frame rate, precise similarity computation can be performed. Further, it is possible to retrieve a part of moving picture similar to a query moving picture from a moving-picture database.

Therefore, even in the case of fixed frame rate or arbitrary frame rate, the present invention can be widely applied to an examination of the number of times a specific moving picture such as a specific news report, commercial, and the opening of a program has been broadcast, a statistic examination of broadcast information, trend investigation, and the like.

Since features can be extracted from moving-picture data in variable feature extraction timing with precise similarity computation, a reduced scale of the moving-picture database 104 can be achieved.

What is claimed is:

1. A method for comparing a first moving picture and a second moving picture, comprising the steps of:
    a) generating first moving-picture feature data from first moving-picture data according to first timing information;
    b) generating second moving-picture feature data from second moving-picture data according to second timing information;
    c) changing at least one of the first moving-picture feature data and the second moving-picture feature data based on the first and second timing information so that one of the first moving-picture feature data and the second moving-picture feature data exists at a time position of the other; and
    d) comparing the first moving-picture feature data and the second moving-picture feature data.

2. A method for computing a degree of similarity between two moving pictures, comprising the steps of:
    a) retrievably storing moving-picture data of each of a plurality of moving pictures and moving-picture feature data generated from the moving-picture data according to feature extraction timing information of the moving-picture data;
    b) inputting query moving-picture data and query feature extraction timing information;
    c) generating query moving-picture feature data from the query moving-picture data according to the query feature extraction timing information;
    d) reading moving-picture feature data of a selected one of the moving pictures stored, as candidate moving-picture feature data, wherein the candidate moving-picture feature data was generated from the selected one according to candidate feature extraction timing information;
    e) changing at least one of the query moving-picture feature data and the candidate moving-picture feature data based on the query and candidate feature extraction timing information so that one of the query moving-picture feature data and the candidate moving-picture feature data exists at a time position of the other; and f) computing the degree of similarity between the query moving-picture feature data and the candidate moving-picture feature data, at least one of which has been changed at the step (e).

3. The method according to claim 2, wherein the step (e) comprises the steps of:
   e.1) comparing time positions designated by the query feature extraction timing information with those designated by the candidate feature extraction timing information; and
   e.2) changing the candidate moving-picture feature data so that the candidate moving-picture feature data exists at a time position of the query moving-picture feature data.

4. The method according to claim 2, wherein the step (e) comprises the steps of:
   e.1) comparing time positions designated by the query feature extraction timing information with those designated by the candidate feature extraction timing information; and
   e.2) changing the query moving-picture feature data so that the query moving-picture feature data exists at a time position of the candidate moving-picture feature data.

5. The method according to claim 2, wherein the step (e) comprises the steps of:
   e.1) generating reference timing information;
   e.2) comparing time positions designated by the query feature extraction timing information with those designated by the reference timing information;
   e.3) changing the query moving-picture feature data so that the query moving-picture feature data exists at a time position designated by the reference timing information;
   e.4) comparing time positions designated by the candidate feature extraction timing information with those designated by the reference timing information; and
   e.5) changing the candidate moving-picture feature data so that the candidate moving-picture feature data exists at a time position designated by the reference timing information.

6. The method according to claim 2, wherein the step (e) comprises the steps of:
   e.1) generating reference timing information from the query and candidate feature extraction timing information according to a predetermined rule;
   e.2) comparing time positions designated by the query feature extraction timing information with those designated by the reference timing information;
   e.3) changing the query moving-picture feature data so that the query moving-picture feature data exists at a time position designated by the reference timing information;
   e.4) comparing time positions designated by the candidate feature extraction timing information with those designated by the reference timing information; and
   e.5) changing the candidate moving-picture feature data so that the candidate moving-picture feature data exists at a time position designated by the reference timing information.

7. The method according to claim 2, wherein the step (e) comprises the steps of:
   e.1) comparing time positions designated by the query feature extraction timing information with those designated by the candidate feature extraction timing information; and
   e.2) interpolating one of the query moving-picture feature data and the candidate moving-picture feature data so that an interpolated one exists at a time position of the other.

8. The method according to claim 2, wherein the step (e) comprises the steps of:
   e.1) comparing time positions designated by the query feature extraction timing information with those designated by the candidate feature extraction timing information;
   e.2) selecting common time positions which are designated by both the query feature extraction timing information and the candidate feature extraction timing information; and
   e.3) changing at least one of the query moving-picture feature data and the candidate moving-picture feature data so that each of the query moving-picture feature data and the candidate moving-picture feature data exists only at the common time positions.

9. The method according to claim 2, wherein the step (e) comprises the steps of:
   e.1) comparing time positions designated by the query feature extraction timing information with those designated by the candidate feature extraction timing information;
   e.2) generating expanded time positions which are designated by at least one of the query feature extraction timing information and the candidate feature extraction timing information; and
   e.3) changing at least one of the query moving-picture feature data and the candidate moving-picture feature data so that each of the query moving-picture feature data and the candidate moving-picture feature data exists at the expanded time positions.

10. A similarity-based retrieval system comprising:
    a database for retrievably storing-moving-picture data of each of a plurality of moving-pictures and moving-picture feature data generated from the moving-picture data according to feature extraction timing information of the moving-picture data;
    a feature extractor for extracting query moving-picture feature data from query moving-picture data according to query feature extraction timing information;
    a feature changer for changing at least one of the query moving-picture feature data and candidate moving-picture feature data based on the query and candidate feature extraction timing information so that one of the query moving-picture feature data and the candidate moving-picture feature data exists at a time position of the other, wherein the candidate moving-picture feature data is moving-picture feature data of a selected one of the moving pictures stored in the moving-picture database, which was generated from the selected one according to the candidate feature extraction timing information; and
    a controller for calculating the degree of similarity between the query moving-picture feature data and the candidate moving-picture feature data, at least one of which has been changed by the feature changer, to retrieve target moving-picture data similar to the query moving-picture data from the moving-picture database.

11. The similarity-based retrieval system according to claim 10, wherein the feature changer compares time positions designated by the query feature extraction timing information with those designated by the candidate feature extraction timing information, and then changes the candidate moving-picture feature data so that the candidate moving-picture feature data exists at a time position of the query moving-picture feature data.

12. The similarity-based retrieval system according to claim 10, wherein the feature changer compares time positions designated by the query feature extraction timing information with those designated by the candidate feature extraction timing information, and then changes the query moving-picture feature data so that the query moving-picture feature data exists at a time position of the candidate moving-picture feature data.

13. The similarity-based retrieval system according to claim 10, further comprising:

a timing generator for generating reference timing information, wherein the feature changer comprises:

a query feature changer for comparing time positions designated by the query feature extraction timing information with those designated by the reference timing information and then changing the query moving-picture feature data so that the query moving-picture feature data exists at a time position designated by the reference timing information; and a candidate feature changer for comparing time positions designated by the candidate feature extraction timing information with those designated by the reference timing information, and then changing the candidate moving-picture feature data so that the candidate moving-picture feature data exists at a time position designated by the reference timing information.

14. The similarity-based retrieval system according to claim 10, further comprising:

a timing generator for generating reference timing information from the query and candidate feature extraction timing information according to a predetermined rule, wherein the feature changer comprises:

a query feature changer for comparing time positions designated by the query feature extraction timing information with those designated by the reference timing information, and then changing the query moving-picture feature data so that the query moving-picture feature data exists at a time position designated by the reference timing information; and a candidate feature changer for comparing time positions designated by the candidate feature extraction timing information with those designated by the reference timing information, and changing the candidate moving-picture feature data so that the candidate moving-picture feature data exists at a time position designated by the reference timing information.

15. The similarity-based retrieval system according to claim 10, wherein the feature changer compares time positions designated by the query feature extraction timing information with those designated by the candidate feature extraction timing information, and interpolates one of the query moving-picture feature data and the candidate moving-picture feature data so that an interpolated-one exists at a time position of the other.

16. The similarity-based retrieval system according to claim 14, wherein the timing generator compares time positions designated by the query feature extraction timing information with those designated by the candidate feature extraction timing information and selects common time positions which are designated by both the query feature extraction timing information and the candidate feature extraction timing information, and the feature changer changes at least one of the query-moving-picture feature data and the candidate moving-picture feature data so that each of the query moving-picture feature data and the candidate moving-picture feature data exists only at the common time positions.

17. The similarity-based retrieval system according to claim 14, wherein the timing generator compares time positions designated by the query feature extraction timing information with those designated by the candidate feature extraction timing information and generates expanded time positions which are designated by at least one of the query feature extraction timing information and the candidate feature extraction timing information, and the feature changer changes at least one of the query moving-picture feature data and the candidate moving-picture feature data so that each of the query moving-picture feature data and the candidate moving-picture feature data exists at the expanded time positions.

18. A storage medium storing a computer program for, the computer program comprising the steps of: for computing a degree of similarity between two moving pictures, comprising the steps of:

a) retrievably storing moving-picture data of each of a plurality of moving-pictures and moving-picture feature data generated from the moving-picture data according to feature extraction timing information of the moving-picture data;

b) inputting query moving-picture data and query feature extraction timing information;

c) generating query moving-picture feature data from the query moving-picture data according to the query feature extraction timing information;

d) reading moving-picture feature data of a selected one of the moving pictures stored, as candidate moving-picture feature data, wherein the candidate moving-picture feature data was generated from the selected one according to candidate feature extraction timing information;

e) changing at least one of the query moving-picture feature data and the candidate moving-picture feature data based on the query and candidate feature extraction timing information so that one of the query moving-picture feature data and the candidate moving-picture feature data exists at a time position of the other; and f) computing the degree of similarity between the query moving-picture feature data and the candidate moving-picture feature data, at least one of which has been changed at the step (e).

* * * * *